Patented Nov. 26, 1935

2,021,945

UNITED STATES PATENT OFFICE 2,021,945

METHOD OF MAKING BLANKS

Burt Howell Payne, Westfield, N. J., assignor to Stulz-Sickles Company, Newark, N. J.

No Drawing. Application June 18, 1932,
Serial No. 618,025

2 Claims. (Cl. 29—148)

My invention relates to metallurgical products and a novel process for making the same and more particularly relates to welding rods and hollow drill steel and novel processes for manufacturing of such welding rods and such hollow drill steel.

Air conditioned manganese nickel steel, such as described in my application, Serial No. 560,877, issued as Patent No. 1,876,738, on September 13, 1932, of which this is a continuation in part, have been found particularly useful as welding rods because of the desirable properties of such alloys such as the toughness, strength, air conditioning, etc. In order, however, to more widely extend its use, the cost of manufacture of such rods must be reduced.

I have discovered a process for manufacturing welding rods which is supplementary to a process for the manufacture of metallurgical products, such as hollow steel rods for use as drills and which accordingly reduces the cost of manufacture of both the welding rod and the hollow drill steel.

In the manufacture of hollow drill steel, a hole is formed through the center of the billet bloom or ingot from which the hollow drill steel is to be made. Sand is then forced into the openings to function as a core. The billet is then heated and worked, as by rolling or forging, to the desired size and shape for forming hollow drill steels. As the billets are worked, the drilled opening is gradually reduced in diameter until a desired diameter is obtained. Thereafter, the sand is blown from the opening and the bar is cut and formed into hollow drill steel.

Difficulties are experienced with this process since the sand fails to keep the hole centrally located and fails to retain the inner surface of the opening smooth.

To overcome these difficulties, cores of ordinary steel bars such as copper and of manganese steel of considerable strength and ductility have been proposed. Copper or equivalent cores are inserted in the opening and the billet then rolled until the opening is of the proper size and the bars have assumed the size and shape for hollow drill steel. Thereafter, the metal core is removed by a pulling operation, leaving the hollow drill steel with the desired opening.

The cores which can be so used are limited to those metals having special properties as, for example, metals which when stretched will elongate substantially uniformly along their entire lengths without local constriction until sufficiently reduced in diameter to permit the whole to be withdrawn from the finished rod. The metal core must also have a greater coefficient of expansion than the hollow drill steel. Such metal cores obviously are expensive.

In all these cases, the removed metal cores are scrapped as useless, thus increasing the cost of manufacture of the hollow drill steel by the cost of these metal cores.

I have discovered that alloys having useful properties such as welding rods, may be inserted as a core in hollow drill steel billets. When these billets are rolled to the proper size and shape and the core removed, these cores may be made useful by proper working and treating thereof, thus avoiding the scrapping of the cores, as heretofore found necessary, and reducing the cost of the manufacture of hollow drill steel. At the same time, the useful core itself is by this process manufactured at a lower cost.

Accordingly, an object of my invention is to provide a novelly constructed hollow drill steel and welding rod, and novel process for manufacture thereof.

A further object of my invention is to provide a novel process for forming welding rods.

Still another object of my invention is to provide a novel welding rod.

Still another object of my invention is to provide a novel process for simultaneously forming welding rods and hollow drill steel.

There are other objects of my invention which together with the foregoing will appear in the detailed description of the invention which is to follow.

In the preferred form of my invention, four inch square billets of the proper quality for hollow mining drill steel are drilled with an approximately $1\frac{7}{16}$ inch diameter hole from end to end, exactly in the center of the four inch square billet. The billet may comprise any grade of tool or alloy steel suitable for hollow drill steel or, if preferred, may be a carbon steel having an analysis preferably of .70% carbon and .20% vanadium. However, it will be understood that these values may vary with the quality of the product desired.

An austenitic steel rod comprised preferably of carbon .60 to .90%; manganese 11 to 13.5%; nickel 2.50 to 3.50%; and silicon .60 to .95% or the equivalent ranges described in my patent application, is used as the core. This alloy has first been rolled to a diameter slightly over $1\frac{7}{16}$ inches and then drawn to the correct diameter in order to obtain a smooth finish. This alloy is then coated with graphite or other suitable preparations, and inserted in the 1 7/8 inch opening in the four inch square billet, making a snug fit therein from end to end. The coating prevents the core from fusing or otherwise cohering to the inside surface of the hollow drill steel. The billet with its core is then placed in a heating furnace and heated to from 1700° to 1800° F. At this temperature, the billet is then worked as, for example, rolled in the manner well known in the art of rolling hollow mining drill steel.

As a result of the rolling process, the billet is elongated and at the same time the core rod in the opening is reduced in diameter until the diameter of the opening is of the proper size necessary in the hollow mining drill steel. In my preferred form, this opening runs approximately from slightly larger than 1/8 inch diameter to slightly less than 1/4 inch diameter, the variation being in accordance with the size of the hollow drill steel; larger diameters being used for larger drill steel and smaller diameters being used for smaller drill steel.

After the billets have been rolled, they are allowed to cool and the ends thereof are cut through to the core. The cut steel ends are then placed between the grips of pulling machines at both ends.

My preferred core has a greater coefficient of expansion than the hollow drill steel and accordingly fits lightly into the opening after being heated and cooled. When it is cooled after the working described above, the greater contraction somewhat loosens the core.

My core also has considerable elasticity. It elongates from 60% to 75% in two inches. When, therefore, the core is put under tension by the pulling machines at both ends, it stretches and finally breaks in two. These two are now of somewhat smaller diameter than the drill opening and the core is accordingly readily removed.

The hollow drill steel, after being worked to proper size and provided with the centrally located hole of proper diameter, is now cut and bits and shanks are formed on the hollow drill steel in the manner well known in the art.

The cores, which have been removed, run approximately 28 feet long. The core at this point in the operation varies in diameter from point to point along its length. Furthermore, it has no finish. Accordingly, it is now heat treated in order to obtain necessary ductility to permit the material to be drawn cold. The cores are then annealed and then drawn cold by a cold drawing process through dies until the desired diameter as, for example, 3/32 inch, 7/64 inch, 1/8 inch, and 1/4 inch, for welding rods uniform throughout its length, has been obtained. When the proper diameter has been obtained, the bars are passed through straightening rolls and are cut off at any desired length, usually 18 inch, 24 inch, and 36 inch, by a high speed cutting wheel.

To obtain a very special finish on these rods, they are rotated in the straightening process, and by passing them over special guides as they revolve, the rods are polished.

By the above described process, welding rods of high grade quality alloys described herein may be produced at a relatively low cost since the rod in the process of its manufacture functions as a core for the manufacture of hollow drill steel.

The cores heretofore used have had to be scrapped as they were of no value. But according to my process, the core is still useful as a welding rod. Similarly, the relative cost of hollow drill steel is also reduced since it no longer requires the scrapping of a considerable amount of steel used as cores as was heretofore the case. Inasmuch as the cores will obviously be of much greater value than scrap steel, the cost of the hollow drill steel is proportionately reduced.

I estimate that for every ton of hollow mining drill steel rolled, there will be approximately 250 lbs. of welding rod produced, and by my novel method of reclaiming from what otherwise would be scrap, high grade welding rods, both the welding rods and the hollow drill can be manufactured at a relatively lower cost than has heretofore been possible.

Although I have described a specific analysis of a welding rod, it will be obvious that any other austenitic steel having the properties of my preferred welding rod may be employed as the core.

It will also be clear that the cores may be used for other useful purposes than for welding rods.

Although I have described a specific construction of hollow drill steel, it will be clear that the hollow drill steel may be of different composition than described for purposes of illustration herein. It may also be of different appearance and construction, provided with any number of openings and the openings being of any desired shape.

Accordingly, I do not intend to limit myself to the specific examples given herein for purposes of illustration, but only so far as set forth in the appended claims.

I claim:

1. A metallurgical process which comprises forming drill billets, drilling an opening through the center thereof from end to end, inserting into the opening a manganese nickel welding alloy in which the content is in the percentage, manganese 11–13.5% and the nickel 2.50 to 3.50%; the alloy when inserted having substantially the same diameter as the opening and having the coefficient of expansion greater than that of the billets, heating the billets with the welding alloy core to approximately 1700° F., rolling the heated billets until the diameter of the opening and the core has reached a predetermined dimension and cooling the billets until the core can be readily removed therefrom.

2. A metallurgical process which comprises forming drill billets, drilling an opening through the center thereof from end to end, inserting into the opening a manganese nickel welding alloy in which the content is in the percentage, manganese 11–13.5% and the nickel 2.50 to 3.50%; the alloy when inserted having substantially the same diameter as the opening and having the coefficient of expansion greater than that of the billets, heating the billets with the welding alloy core to approximately 1700° F., rolling the heated billets until the diameter of the opening and the core has reached a predetermined dimension and cooling the billets until the core can be readily removed therefrom and pulling the core from the opening in the billets and simultaneously stretching it due to the core's elasticity during the pulling process.

BURT HOWELL PAYNE.